US00RE46047E

(19) United States
(12) Reissued Patent
Higgins

(10) Patent Number: US RE46,047 E
(45) Date of Reissued Patent: Jul. 5, 2016

(54) POLY BOTTLE

(71) Applicant: Custom Metalcraft, Inc., Springfield, MO (US)

(72) Inventor: Scott Higgins, Ozark, MO (US)

(73) Assignee: Custom Metalcraft, Inc., Springfield, MO (US)

(21) Appl. No.: 29/501,368

(22) Filed: Sep. 3, 2014

Related U.S. Patent Documents

Reissue of:
(64) Patent No.: Des. 666,691
Issued: Sep. 4, 2012
Appl. No.: 29/393,157
Filed: May 31, 2011

(51) LOC (10) Cl. ..... 23-01
(52) U.S. Cl.
USPC ..... D23/202
(58) Field of Classification Search
USPC ..... D23/202; D25/121, 126
CPC ..... B65D 7/00; B65D 77/0466; B65D 1/20; B65D 1/00; B65D 21/023; B65D 88/08; B65D 90/08; B65D 90/10; B65D 19/00; B65D 19/06; B67D 3/00
See application file for complete search history.

(56) References Cited

U.S. PATENT DOCUMENTS

| | | | | | |
|---|---|---|---|---|---|
| 4,173,288 | A | | 11/1979 | Schutz | 220/1.5 |
| 4,580,680 | A | * | 4/1986 | Wind | 206/386 |
| D298,450 | S | * | 11/1988 | Thomas et al. | D23/202 |
| 5,029,734 | A | * | 7/1991 | Nichols | B65D 19/069 108/55.3 |
| 5,111,937 | A | | 5/1992 | Schutz | 206/386 |
| D332,130 | S | * | 12/1992 | Przytulla | D23/202 |
| D336,327 | S | | 6/1993 | Zorb et al. | D23/202 |
| D337,367 | S | * | 7/1993 | McKenzie et al. | D23/202 |
| 5,253,777 | A | | 10/1993 | Schutz | 220/571 |
| 5,259,509 | A | | 11/1993 | Boal, Jr. et al. | 206/597 |
| 5,316,174 | A | | 5/1994 | Schutz | 220/571 |
| 5,544,777 | A | * | 8/1996 | Watson | B65D 1/16 220/1.5 |
| 5,704,477 | A | * | 1/1998 | Hermann | B65D 77/0466 206/386 |
| D394,302 | S | * | 5/1998 | Harris et al. | D23/200 |
| 5,794,818 | A | | 8/1998 | Bromwell et al. | 222/105 |
| D418,196 | S | * | 12/1999 | Faltys et al. | D23/202 |
| 6,244,159 | B1 | * | 6/2001 | Kimura et al. | 92/12.2 |
| 6,244,459 | B1 | | 6/2001 | Bouc et al. | |
| 6,318,598 | B1 | | 11/2001 | Schmitt | 222/143 |
| 6,484,899 | B1 | | 11/2002 | Garton | 220/630 |
| 6,719,162 | B2 | | 4/2004 | Przytulla | 220/23.91 |
| 6,772,912 | B1 | * | 8/2004 | Schall | B65D 19/04 222/143 |
| 7,036,662 | B2 | * | 5/2006 | Schutz | 206/386 |
| 7,108,133 | B2 | | 9/2006 | Przytulla | 206/386 |
| 7,159,718 | B2 | * | 1/2007 | Cassina | 206/524.3 |
| D550,325 | S | * | 9/2007 | Claussen et al. | D23/202 |
| 7,575,118 | B2 | * | 8/2009 | Richter et al. | 206/386 |
| 7,861,877 | B2 | | 1/2011 | Higgins | 220/6 |
| 7,874,443 | B2 | * | 1/2011 | Schutz | B65D 1/46 220/1.5 |
| 7,878,327 | B2 | * | 2/2011 | Cassina | 206/386 |
| D634,395 | S | * | 3/2011 | Raz et al. | D23/202 |
| 7,978,067 | B2 | | 7/2011 | Wagner et al. | 340/539.26 |
| 2006/0032854 | A1 | | 2/2006 | Schutz | 220/562 |
| 2007/0056975 | A1 | | 3/2007 | Long et al. | 220/565 |
| 2009/0050631 | A1 | | 2/2009 | Redmond et al. | 220/565 |

* cited by examiner

*Primary Examiner* — Phillip S Hyder
(74) *Attorney, Agent, or Firm* — Hovey Williams LLP

(57) CLAIM

The ornamental design for a poly bottle, as shown and described.

DESCRIPTION

[FIG. 1 is an upper front perspective of a poly bottle embodying my design;]

[FIG. 2 is a lower front perspective of the poly bottle shown in FIG. 1;]

[FIG. 3 is a front elevation of the poly bottle shown in FIGS. 1 and 2;]

[FIG. 4 is a right side elevation of the poly bottle shown in FIGS. 1-3, with the opposite side elevation being a mirror image thereof;]

(NEW) (NEW)

[FIG. 5 is a rear elevation of the poly bottle shown in FIGS. 1-4;]
[FIG. 6 is a top view of the poly bottle shown in FIGS. 1-5;]
[FIG. 7 is a bottom view of the poly bottle shown in FIGS. 1-6;]
[FIG. 8 is an upper front perspective of the poly bottle shown in FIGS. 1-7, but with the pallet removed;]
[FIG. 9 is a lower front perspective of the poly bottle shown in FIG. 8;]
[FIG. 10 is a front elevation of the bottle poly shown in FIGS. 8 and 9;]
[FIG. 11 is a right side elevation of the poly bottle shown in FIGS. 8-10, with the opposite side elevation being a mirror image thereof;]
[FIG. 12 is a rear elevation of the poly bottle shown in FIGS. 8-11;]
[FIG. 13 is a top view of the poly bottle shown in FIGS. 8-12;]
[FIG. 14 is a bottom view of the poly bottle shown in FIGS. 8-13;]
[FIG. 15 is an upper front perspective of the pallet of the poly bottle shown in FIGS. 1-7;]
[FIG. 16 is a lower front perspective of the pallet shown in FIG. 15;]
[FIG. 17 is a front elevation of the pallet shown in FIGS. 15 and 16;]
[FIG. 18 is a right side elevation of the pallet shown in FIGS. 15-17, with the opposite side elevation being a mirror image thereof;]
[FIG. 19 is a rear elevation of the pallet shown in FIGS. 15-18;]
[FIG. 20 is a top view of the pallet shown in FIGS. 15-19; and,]
[FIG. 21 is a bottom view of the pallet shown in FIGS. 15-20.]
*FIG. 22 is an upper front perspective of a poly bottle embodying my design;*
*FIG. 23 is another front perspective of the poly bottle shown in FIG. 22;*
*FIG. 24 is a front elevation of the poly bottle shown in FIGS. 22 and 23;*
*FIG. 25 is a right side elevation of the poly bottle shown in FIGS. 22-24, with the opposite side elevation being a mirror image thereof;*
*FIG. 26 is a rear elevation of the poly bottle shown in FIGS. 22-25; and,*
*FIG. 27 is a top view of the poly bottle shown in FIGS. 22-26. In the drawings, the broken lines directed adjacent to the upper and lower perimeter of the side surfaces represent boundaries, all other broken lies depicted portions of the poly bottle in which the design is embodied that form no part of the claimed design.*

1 Claim, 6 Drawing Sheets

---

Matter enclosed in heavy brackets [ ] appears in the original patent but forms no part of this reissue; matter printed in italics indicates the additions made by reissue.

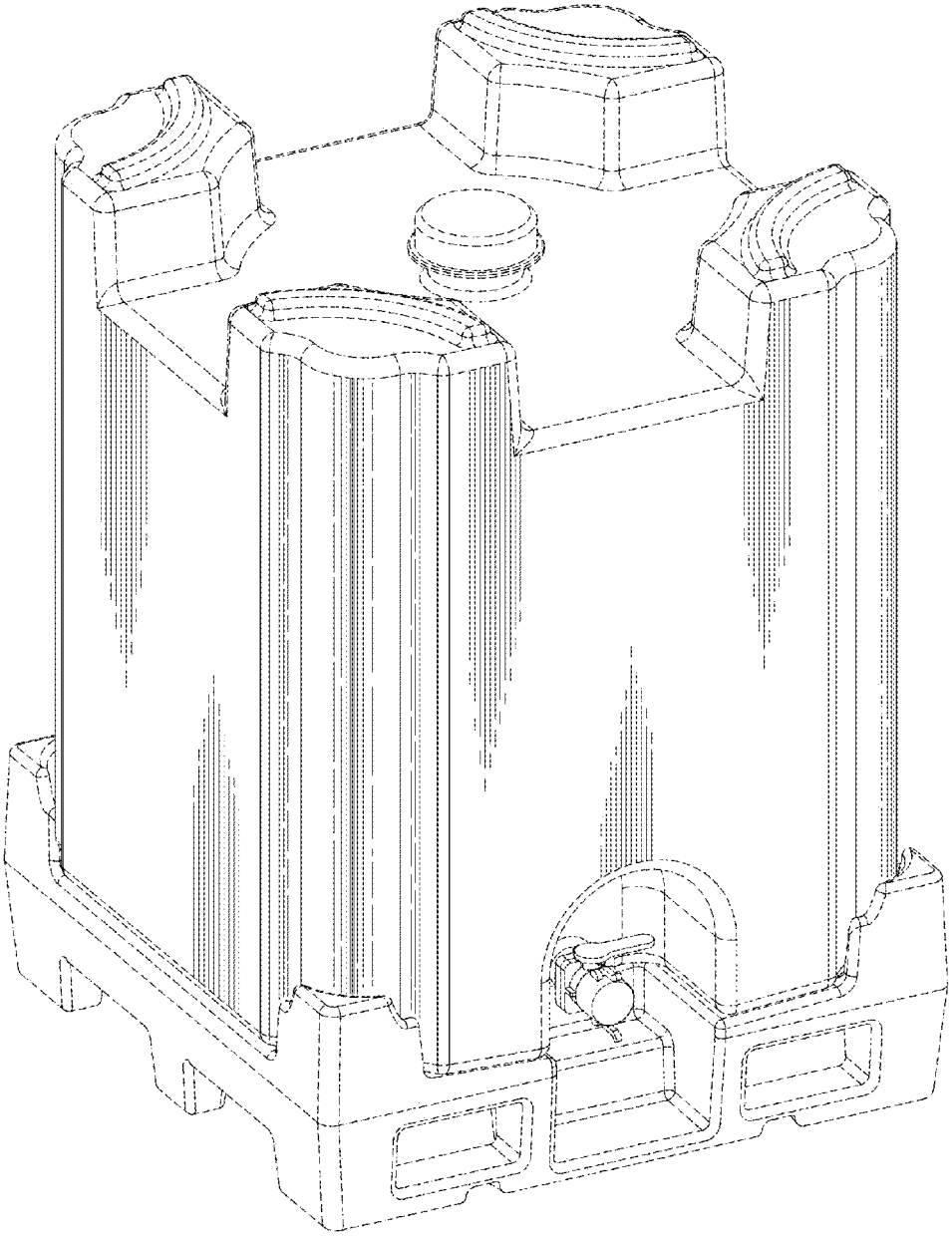
Fig. 22.
(NEW)

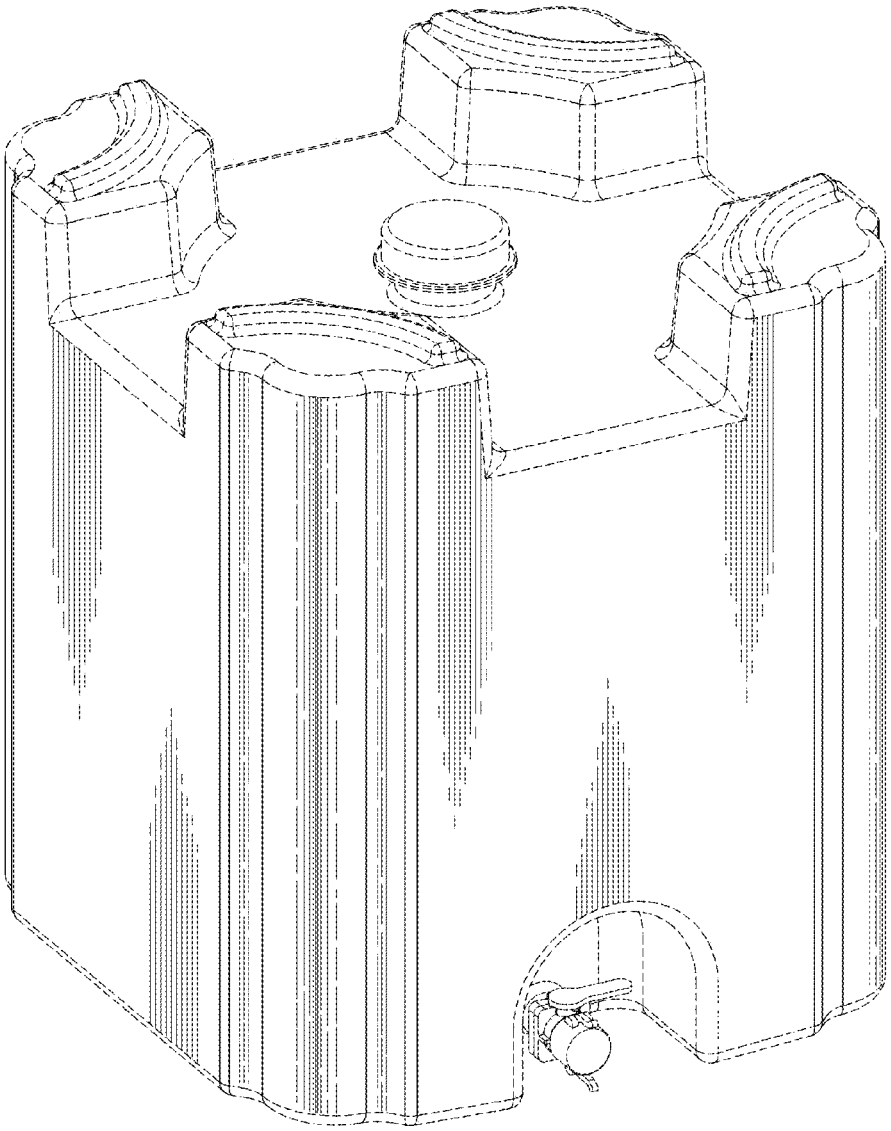
Fig. 23.
(NEW)

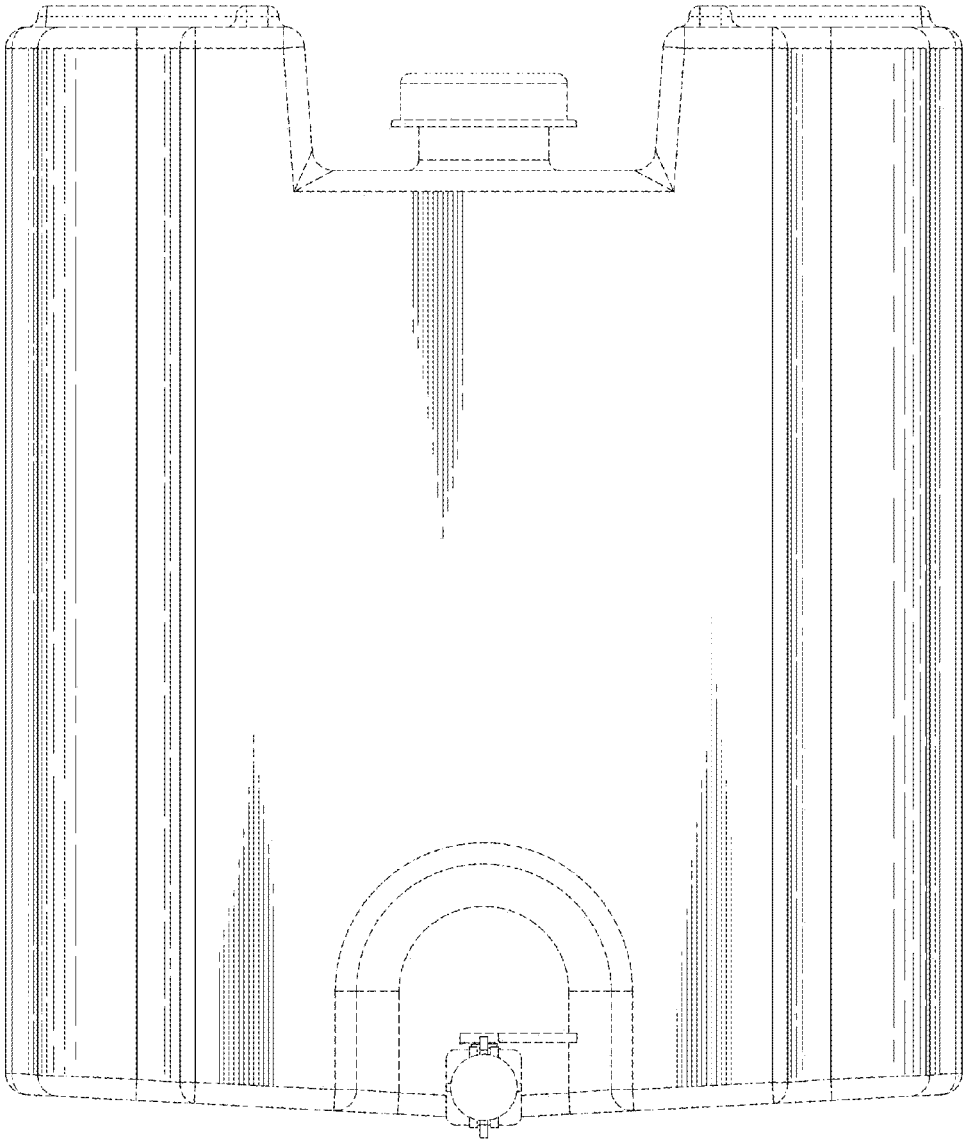
Fig. 24.
(NEW)

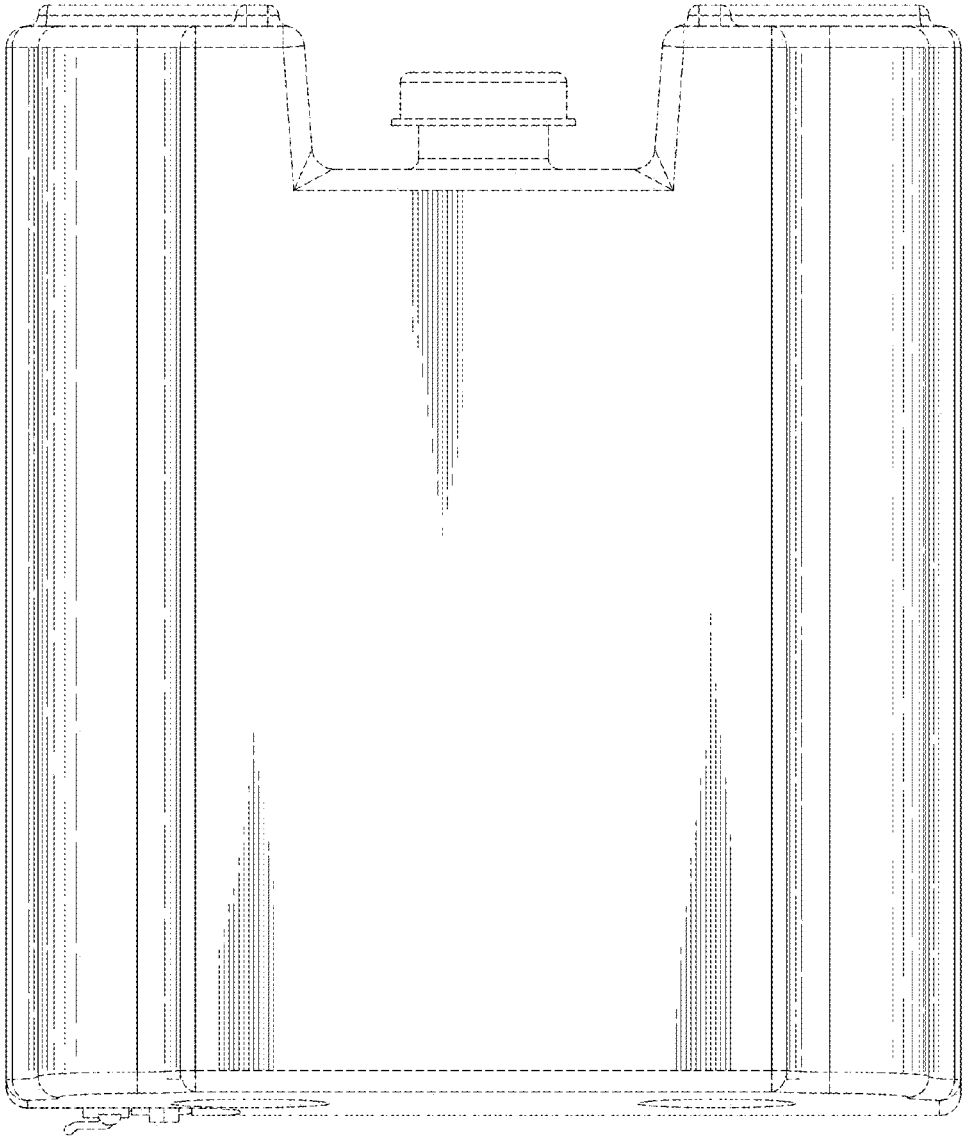
Fig. 25.
(NEW)

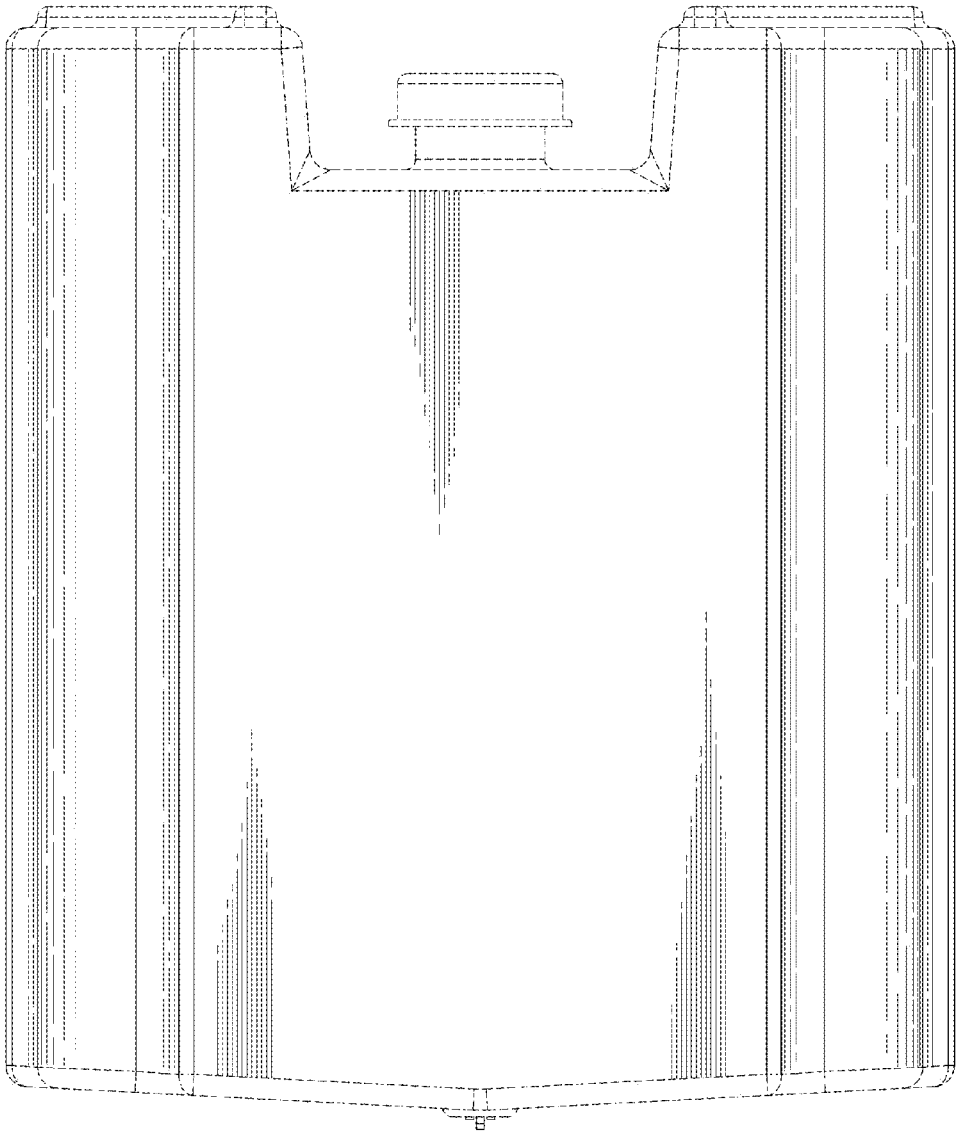
Fig. 26.
(NEW)

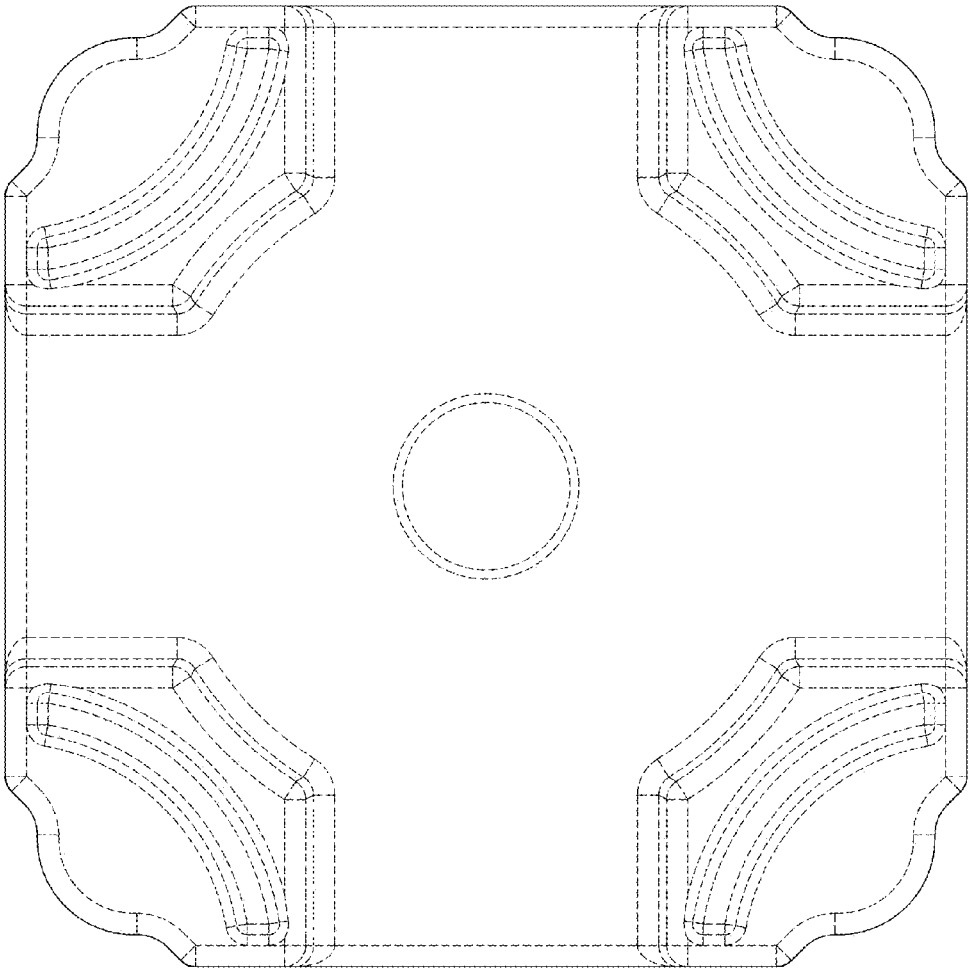
Fig. 27.
(NEW)